April 4, 1961

J. H. SILVERMAN 2,978,600

IONIC BRUSH

Filed Jan. 21, 1958

Inventor
Jerome H. Silverman
by Hill, Sherman, Meroni, Gross & Simpson Attys

April 4, 1961 J. H. SILVERMAN 2,978,600
IONIC BRUSH
Filed Jan. 21, 1958 3 Sheets-Sheet 3

Inventor
Jerome H. Silverman

United States Patent Office 2,978,600
Patented Apr. 4, 1961

2,978,600
IONIC BRUSH
Jerome H. Silverman, Euclid, Ohio, assignor to Thompson Ramo Wooldridge, Inc., a corporation of Ohio
Filed Jan. 21, 1958, Ser. No. 710,339
17 Claims. (Cl. 310—232)

This invention relates to electrical machinery having novel means for establishing electrical continuity with moving parts thereof and particularly to rotating electrical machines utilizing a space current in a gaseous medium to establish electrical connection with the rotating parts of the machines instead of the usual mechanical slip ring brushes making frictional contact with the rotating parts.

It is an important object of the present invention to provide a novel method and means for establishing electrical continuity with moving parts of electrical apparatus without friction or mechanical contact with such moving parts.

It is another object of the invention to provide a novel method and means for providing electrical connection with moving parts of electrical apparatus which will operate at ambient temperatures far beyond the best mechanical brushes in existence.

A further object of the invention resides in the provision of electrical machinery having novel means for establishing electrical continuity with moving parts thereof which means also provides a rectifying function.

Still another object of the invention resides in the provision of electrical apparatus having means for establishing electrical continuity with moving parts thereof which further provides a current control function.

Another and further object of the invention is to provide a novel system of electrical components utilizing space current establishing means for connecting with moving parts and performing rectifying and/or control functions in the system.

Other objects, features and advantages of the present invention will be apparent from the following detailed description taken in connection with the accompanying drawings, in which.

Figure 1:
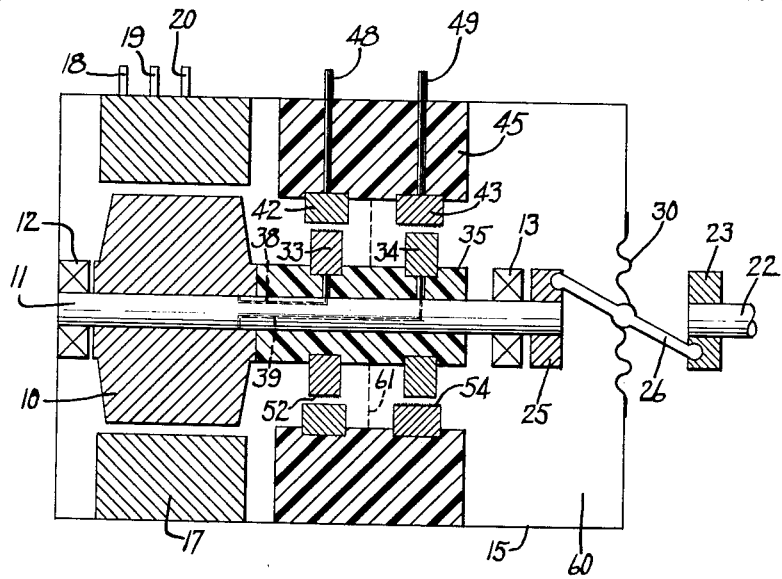
Figure 1 is a somewhat diagrammatic longitudinal sectional view of an alternator in accordance with a first embodiment of the present invention.

Figure 1 illustrates a first embodiment of the invention wherein an alternator includes a rotor 10 which is mounted by means of a shaft 11 journalled in bearings 12 and 13 of a hermetically sealed housing 15. A stator winding is diagrammatically indicated at 17. Output terminals 18, 19 and 20 are electrically connected with the stator winding 17 and are, of course, hermetically sealed with the housing 15. Shaft 11 is illustrated as being driven from an input shaft 22 by means of a suitable mechanical coupling including a crank member 23 secured to shaft 22, a crank member 25 secured to shaft 11 and a link 26 extending between the crank members 23 and 24 and having ball and socket connection with the crank members. The housing 15 includes a flexible diaphragm portion 30 sealed to the center of the link 26 to accommodate the movement of the link 26 during driving of the shaft 11 from the input shaft 22.

In order to establish a D.C. field in the rotor 10, a pair of conductive rings 33 and 34 are mounted in an insulating sleeve 35 secured to and rotating with the shaft 11. These rings 33 and 34 may be connected with the rotor winding by means of conductors 38 and 39 extending within the rotor shaft 11 as diagrammatically indicated in Figure 1. For establishing electrical continuity with the annular rings 33 and 34, a pair of stationary rings 42 and 43 are mounted in spaced concentric relation to the rotating rings 33 and 34, respectively, by means of an insulating block indicated at 45. Annular gaps thus exist between the stationary rings 42 and 43 and the rotating rings 33 and 34 so that there is no mechanical contact or friction therebetween. Terminals 48 and 49 are illustrated connecting with the stationary rings 42 and 43 and these terminals are hermetically sealed to the housing 15.

For establishing electrical continuity between the stationary rings 42 and 43 and the moving rings 33 and 34, a space current is established in the gaps between the respective rings. In the illustrated embodiment, this is accomplished by providing moving ring 33 with a thermionic annular surface coating 52 and by providing the stationary ring 43 with a similar coating indicated at 54. The housing 15 may be provided with a gaseous medium such as mercury vapor, other metal vapors, helium, neon, argon, krypton, or xenon. The respective pairs of rings 33 and 42, and 34 and 43 are thus similar in operation to thermionic gas-filled diodes, with the exception that one of the diode elements is rotating. The thermionic surfaces 52 and 54 may be heated by any suitable means to cause emission of electrons therefrom. For example, a resistance element may be disposed in heat transfer relation to the thermionic surface 54 about its entire annular extent and energized with a suitable heating current. More specifically, the heating element could be embedded in the ring 43 adjacent the surface 54 and could be energized from suitable hermetically sealed terminals and conductors extending from the terminals to the heater element within the insulating block 45. Such an arrangement would not be as convenient for heating the thermionic surface 52 since there would be the problem of delivering heater current to the heating element which would be rotating with the ring 33. The gaseous medium indicated generally by the reference numeral 60 in Figure 1 may be heated to a high temperature, for example as a result of the heat generated by adjacent apparatus. Such heat from surrounding atmosphere or adjacent apparatus might also be transmitted to the surface 52 by means of the bearings 12 and 13, shaft 11 and insulating sleeve 35 and through the gas. An electric arc might be established between the ring 33 and an electrode disposed adjacent a side of the ring 33 to heat the ring 33 and initiate thermionic emission. Since ions produced during operation once thermionic emission is initiated may be drawn to the thermionic cathode, at higher operating voltages they may strike the cathode with sufficient velocity to cause appreciable local heating. Thus, once thermionic emission is started, the emission can continue without the electric arc heating of the ring 33. With a cathode of small heat capacity, sufficient voltage may be applied to render the unit self-starting, even without high ambient temperatures. A further alternative would be to provide a friction device for engaging a side of the ring 33, for example, to generate sufficient heat in the ring 33 to initiate thermionic emission.

In the illustrated embodiment the gas 60 is maintained at a pressure of approximately 50 to 75 mm. of mercury to retard the rate of evaporation of the thermionic surface and protect it from damage due to ion bombardment. The thermionic surfaces 52 and 54 need not have any special heating means associated therewith, since the applied voltage, which is of the order of a few hundred volts, is sufficient to cause breakdown of the gas, resulting in an electric arc which heats the cathode to temperatures at which thermionic emission will take place. The arc then extinguishes itself because of the low impedance of the ionized gas column. The cathode maintains itself at a high temperature due to the passage of current through it, and thus maintains the condition of thermionic emission.

The electron emission of thermionic surfaces 52 and 54 is a function of the material of the surface, the temperature of the surface, and the area of the emitting surface. Currents of the order of 100 amperes may easily be drawn from such emitting surfaces under the proper conditions. Certain oxides may be used for the thermionic surfaces 52 and 54, although thoriated tungsten is adequate for currents of 10 amperes and less. The ion current contributes only a negligible amount to the total current. The current which flows will be limited only by the source and load impedances connected between terminals 48 and 49, and conductors 38 and 39, respectively, and the saturation current of the thermionic surfaces 52 and 54. The voltage drop between the rings 33 and 42, and 34 and 43 is relatively low, and for most inert gases is of the order of 10 to 20 volts.

Since a D.C. power source is to be connected to terminals 48 and 49, with the positive side of the power source connected to terminals 48, there will be no problem of arc-back between rings 33 and 42, or between rings 34 and 43; however an electrostatic screen 61 is provided between the two pairs of rings to prevent arcing between the pairs of rings. The electrostatic screen 61 may be a wire mesh screen or perforated plate fastened to the stationary insulation block 45. Clearance is provided between the screen and the rotating sleeve 35 so that no physical contact takes place. The use of a mesh or perforated metal permits a limited circulation of the gas throughout the unit, while still providing adequate electrical shielding.

Figure 2:
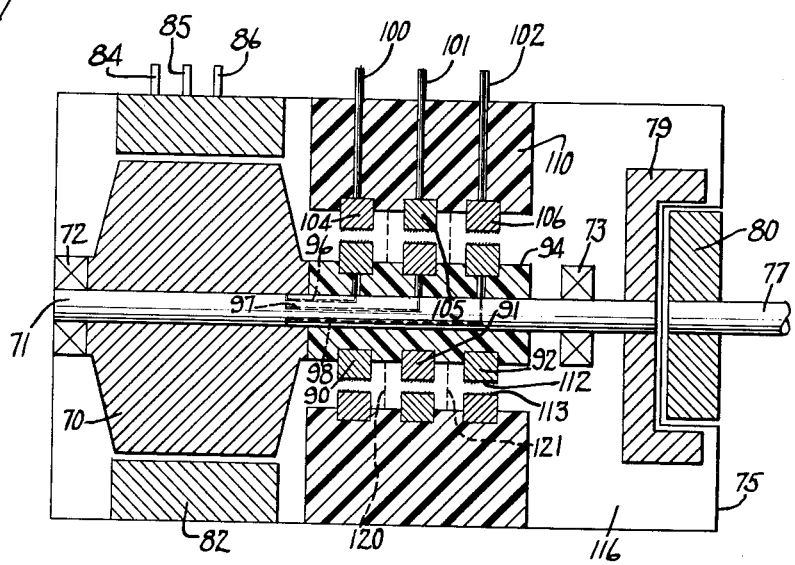
Figure 2 is a somewhat diagrammatic longitudinal sectional view illustrating a three phase motor or alternator in accordance with a second embodiment of the present invention.

Figure 2 illustrates a three phase motor or alternator comprising a rotor assembly 70 supported by a shaft 71 mounted in bearings 72 and 73 of a hermetically sealed housing 75. Shaft 71 is coupled to a second shaft 77 by means of a magnetic coupling including member 79 within the sealed housing and a member 80 outside of the housing. A stator winding is diagrammatically illustrated at 82 and is connected with terminals 84, 85 and 86 sealed to the housing.

Three rotating rings 90, 91 and 92 are illustrated as being mounted in an electrically insulating sleeve 94 on shaft 71 for rotation therewith. The rings are diagrammatically indicated to be connected with the rotor winding by means of conductors 96, 97 and 98 extending within the shaft 71. External terminals 100, 101 and 102 are illustrated as being sealed to the housing and connecting with stationary rings 104, 105 and 106 carried by an annular electrically insulating block 110. In this embodiment, the confronting annular surfaces of each of the stationary and rotating rings is provided with a thermionic coating, for example as indicated at 112 and at 113. In this construction current can flow either from the rotating rings 90, 91 and 92 to the stationary rings 104, 105 and 106, or from stationary rings 104, 105 and 106 to the rotating rings 90, 91 and 92. The housing 75 is preferably filled with a gas 116 under a pressure of approximately 50 to 75 mm. of mercury, and the gas may be any of those listed in connection with Figure 1. Thermionic emission may be initiated from the surfaces such as 112 and 113 in Figure 2 without the use of special heating means, since the applied voltage, of the order of a few hundred volts, is sufficient to cause a breakdown of the gas, resulting in an electric arc which heats the surfaces such as 112 and 113 to temperatures at which thermionic emission will take place. The arc then extinguishes itself because of the low impedance of the ionized gas column. The surfaces such as 112 and 113 are then maintained at a high temperature by the passage of current through them to thus maintain the condition of thermionic emission. Alternatively, heating of the thermionic surfaces such as 112 and 113 may be accomplished by any of the means described in connection with Figure 1. Annular electrostatic shields are indicated in Figure 2 at 120 and 121.

By way of example, three phase current may be derived from terminals 100, 101 and 102 for control purposes when the unit is operated as a wound rotor induction motor with three phase power being applied to terminals 84, 85 and 86. The rings such as 90 and 104 provide electrical continuity in each direction in the same manner as a mechanical brush physically engaging a slip ring.

Figure 3:
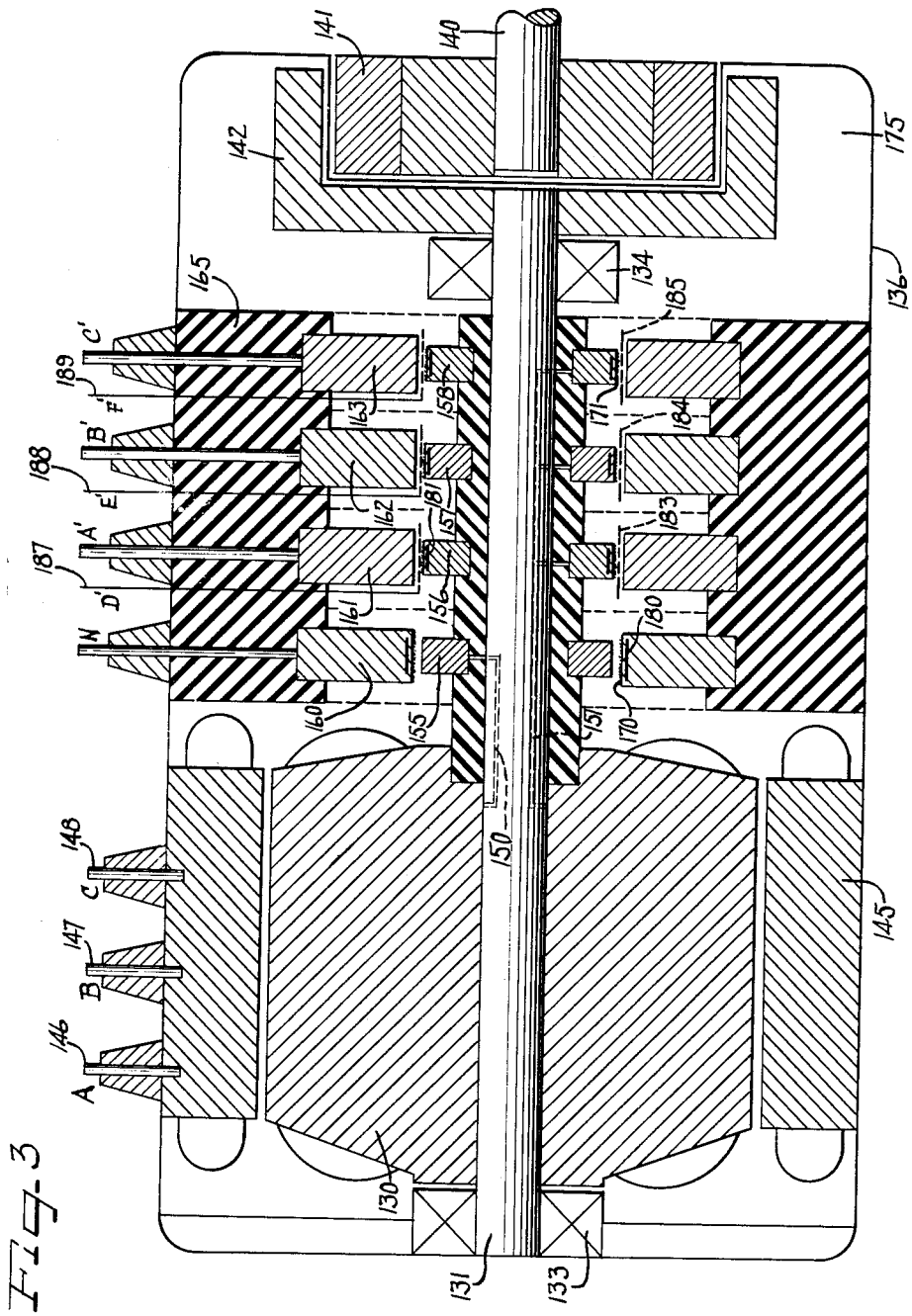
Figure 3 is a somewhat diagrammatic longitudinal sectional view of a three phase alternator including rectifying and control functions in accordance with a third embodiment of the present invention.

Figure 3 represents a modified construction wherein a rotor 130 has a winding which is to be supplied with a D.C. current from a three phase alternating current supply. As in the previous embodiments, a rotor shaft 131 is mounted in bearings 133 and 134 supported by a hermetically sealed housing 136. The shaft 131 is driven by an input shaft 140 through a magnetic coupling including a member 141 secured to shaft 140 outside of the housing 136 and a member 142 secured to the shaft 131 inside of the housing 136. A stator 145 is indicated having terminals 146, 147 and 148 connected with the winding thereof and hermetically sealed to the housing 136. The rotor winding is indicated as being energized by a pair of conductors 150 and 151 extending within shaft 131, the conductor 150 connecting with a rotating ring 155, and the conductor 151 connecting with rotating rings 156, 157 and 158. Cooperating stationary rings 160, 161, 162 and 163 are mounted in concentric surrounding relation to the rotating rings, respectively, by means of an electrically insulating block 165.

In order to provide for rectification of the three phase alternating current, fixed ring 160 is provided with a thermionic surface 170, while rotating rings 156, 157 and 158 are each provided with an annular thermionic surface coating such as indicated at 171. Since the rings in this case are to act as rectifiers, arc-back when a reverse voltage is applied to the rings must be prevented. The voltage at which the gas 175 within the housing 136 would support an arc discharge is inversely proportional to a function of the gas pressure, so that the gas pressure must be kept low, for example 0.2 mm. of mercury absolute, in order to prevent arc-back between the rectifying rings. The gas 175 may be any of the ones listed in connection with Figure 1, and any of the special heating means described in Figure 1 may be utilized for heating the surfaces 170 and 171 to cause thermionic emission. By way of specific example, radioactive isotope heating may be utilized, with radioactive material enclosed by the rings to be heated as indicated at 180 and 181.

Alternatively, the heating means such as indicated at 180 and 181 may comprise electrical heating elements encased within the rings. Electrical power may be supplied to the heating elements by inducing a voltage in the rotor through a special auxiliary rotor and stator winding. The auxiliary stator winding would be deenergized once the unit was operating and could maintain the thermionic emission through heat generated by internal losses.

To illustrate a further feature of the present invention, annular grids 183, 184 and 185 have been diagrammatically indicated as being interposed between the respective rings 156, 157 and 158 and 161, 162 and 163. These grids may be connected to suitable terminals such as diagrammatically indicated at 187, 188 and 189 sealed to the housing 136 in the same manner as the other terminals. The control grids 183, 184 and 185 may be supported by ceramic bushings extending at intervals from the stationary insulating block 165. One ceramic bushing for each grid may be hollow and contain the corresponding conductor 187, 188 or 189. These grids are capable of controlling the point in each cycle of the applied voltage when conduction will begin, in order to control the amount of current supplied to the rotor winding by means of conductors 150 and 151. The rings together with the associated grids thus act similarly to thyratrons and provide a control function as well as the rectifying function in addition to their primary function of providing electrical continuity between relatively moving parts.

It will be understood that in each of the preceding embodiments, the necessity of a gas under pressure or vacuum with respect to the ambient pressure indicates that the machine must be sealed from leakage or other provision made, such as continuous pumping or continuous pressurization to maintain the operating conditions. In addition, precautions must be taken to prevent contamination of the gas by undesirable elements.

Figure 4:
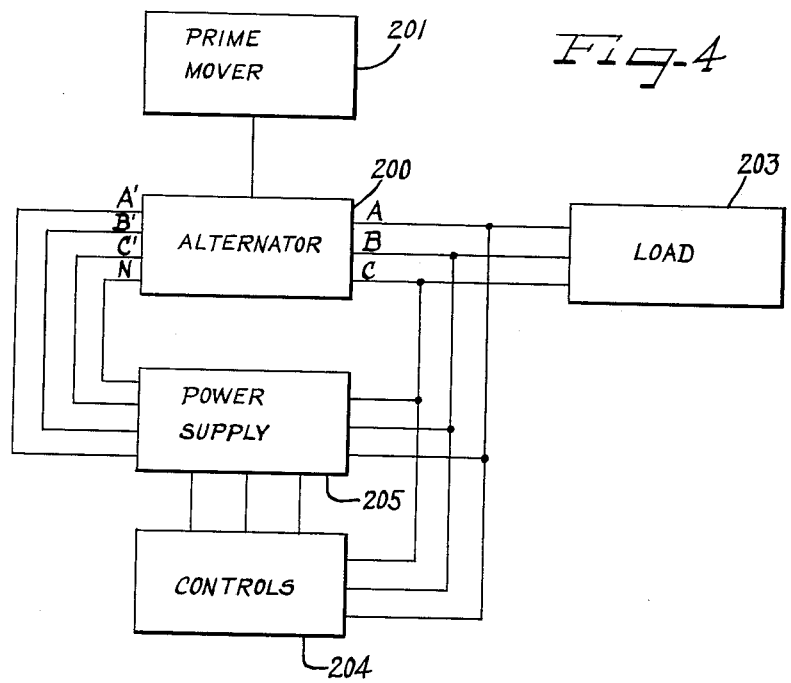
Figure 4 is a diagrammatic illustration of a system including an alternator similar to that of Figure 3.

Figure 4 illustrates an alternator system wherein an alternator 200 may be employed similar to that shown in Figure 3 but without utilizing the grids 183, 184 and 185 of the alternator of Figure 3. In Figure 4 the alternator 200 is indicated as being mechanically driven by means of a prime mover 201 corresponding to the input shaft in Figure 3. The output from terminals A, B and C in Figure 3 is indicated in Figure 4 as being delivered to a load 203 as well as to a control circuit 204 and a power supply circuit 205. The control circuit 204 is illustrated as controlling the power supply circuit 205 to deliver a suitable three phase alternating current to terminals A', B' and C' in Figure 3 for internal rectification within the alternator 200. This circuit illustrates the elimination of the usual external rectifier means which would normally be interposed between the power supply circuit 205 and the field terminals of the alternator.

Figure 5:
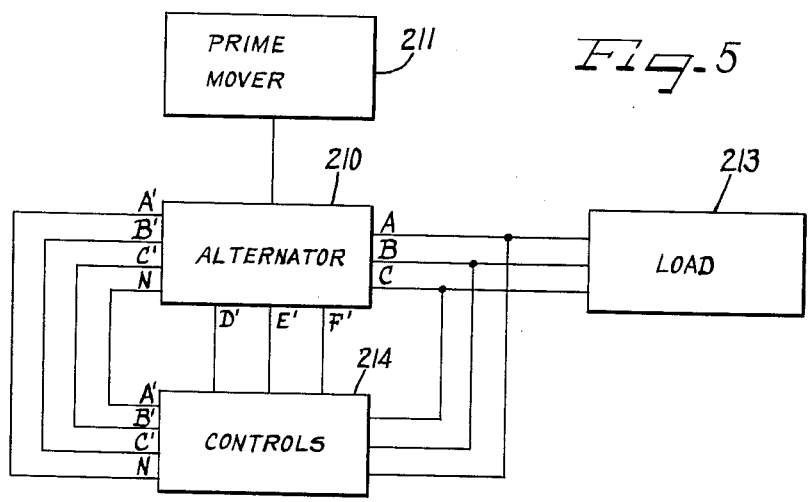
Figure 5 is a diagrammatic illustration of a modified system including an alternator in accordance with Figure 3.

Figure 5 illustrates an alternator system wherein alternator 210 corresponds to the alternator of Figure 3 and includes the control grids 183, 184 and 185 of the alternator of Figure 3. The alternator 210 is driven by means of a suitable prime mover 211 to deliver an output from terminals A, B and C to a load circuit 213 and a control circuit 214. The control circuit 214 is illustrated as supplying the output three phase voltage to terminals A', B' and C' and controlling the D.C. rotor field current by means of connections to the grids 183, 184 and 185 indicated at D', E' and F'. This illustrates a further system simplification which is possible as a result of the present invention wherein the power supply circuit of Figure 4 may be omitted because of the control function provided by the grids 183, 184 and 185 illustrated in Figure 3.

Summarizing the operation of the illustrated embodiment, in Figure 1, rings 33 and 42 and 35 and 43 simulate the elements of a gas-filled diode with the rings 33 and 43 provided with thermionic surfaces 52 and 54. A D.C. voltage is applied to terminals 48 and 49 to supply a D.C. field current to the winding of rotor 10 via conductors 38 and 39 without any physical contact or friction between rings 33 and 34, and 42 and 43.

In Figure 2, a three phase alternating current voltage may be supplied to terminals 84, 85 and 86, and three phase current may be derived from terminals 100, 101 and 102 for control purposes. The surfaces of each of the rings 90, 91, 92, 104, 105 and 106 is coated with a thermionic material such as indicated at 112 and 113 to accommodate conduction between the respective rings in either direction in the same manner as a conventional mechanical brush and slip ring.

Figure 3 illustrates the case of an alternator wherein the rotor field winding is excited with a D.C. current by means of conductors 150 and 151, while terminals A', B' and C' are supplied with a three phase alternating current voltage having a common return connected with terminal N. In this case, rings 156, 157 and 158 are supplied with thermionic surfaces as indicated at 171 and ring 160 is provided with a thermionic surface 170, so that the confronting pairs of rings act as rectifiers, with ring pairs 156—161, 157—162 and 158—163 acting to conduct current to conductor 151, while ring pair 155—160 acts to conduct current in the opposite direction from conductor 150 to terminal N. A further feature of the embodiment of Figure 3 resides in the provision of control grids 183, 184, and 185 in the gaps between ring pairs 156—161, 157—162 and 158—163, respectively. By this means, the ring pairs act as thyratrons, and a control voltage supplied to the grids acts to control the time of conduction between the ring pairs in each cycle of the voltage applied to terminals A', B' and C'.

Figure 4 illustrates the elimination of the external rectifiers from an alternator system including an alternator such as illustrated in Figure 3, and Figure 5 illustrates the elimination of external rectifiers and external power supply in the case of an alternator such as illustrated in Figure 3 wherein both the rectifying and control functions are included internally of the alternator.

It will be apparent that many modifications and variations may be effected without departing from the scope of the novel concepts of the present invention.

I claim as my invention:

1. An electro-mechanical machine having a rotating part with a circuit for its interacting current at least in part through said rotating part, said circuit including a frictionless ionic brush means for said interacting current comprising a pair of spaced and relatively rotating electrodes of which at least one rotates with said part and both of which are shaped and positioned to provide a substantially constant width gap therebetween during said relative rotation, at least one of said electrodes having an electron emissive thermionic surface and means to provide an ionizable gaseous medium in said gap.

2. An electro-mechanical machine comprising a rotor with an electric circuit carrying its operating current, said circuit including a conductive electrode rotating therewith and of generally annular configuration and a stationary conductive electrode spaced therefrom to provide an annular and relatively rotating gap therebetween, means to provide an ionizable gas in said gap, and electron emissive thermionic surface means on at least one of said electrodes to ionize said gas so that it may carry said operating current.

3. An electro-mechanical machine comprising a housing, a rotor in said housing carrying at least part of a circuit including a rotor winding and at least one directly connected electrode on said rotor, said circuit also including a stationary conductive electrode spaced from said rotor electrode to provide a relatively rotatable gap therebetween, and brush means for carrying said rotor winding current as a space current flow across said gap comprising an ionizable gaseous medium sealed in said housing and in said gap and a thermionically emissive material on the operative surface of at least one of said electrodes to ionize said gaseous medium.

4. An electro-mechanical machine comprising a rotor with an electric circuit for its interacting current including a rotor winding mounted on said motor and a connected electrode on said rotor, said circuit including a second and relatively rotatable electrode spaced from said rotor electrode to provide a relatively rotatable gap therebetween, and means for establishing and maintaining the flow of said rotor winding current across said relatively rotatable gap as a space current comprising a thermionically emissive material surface operatively associated with said rotor electrode, heating means for said emissive surface, and an ionizable gas means in said gap ionized by said emissive surface.

5. An electro-mechanical machine comprising a rotor carrying only a part of at least one electric circuit for its operating current, said circuit including a rotor winding and a connected electrode both on said rotor, said circuit also including a second electrode spaced from said rotating electrode to provide a relatively rotating and ionizable gas-filled gap therebetween, and means for establishing and maintaining the flow of said rotor winding current across said relatively rotating gap as a space current in either direction comprising thermionically emissive surfaces operatively associated with each of said electrodes to ionize the gas in said gap for either direction of voltage thereacross to thus provide an ionizable gaseous brush means for an alternating current.

6. An electro-mechanical machine comprising a rotor including only part of a machine operating current circuit, said circuit including an electrode on said rotor, a stator electrode spaced therefrom to provide a relative rotating gap therebetween, and gaseous brush means in said gap comprising a thermionically emissive surface associated with one of said electrodes and means for maintaining in said gap an ionizable gas at a pressure of less than about 0.2 mm. of mercury absolute.

7. An electro-mechanical machine comprising a rotor carrying a winding forming a part of a machine operating current circuit, said circuit also including a connected electrode on said rotor and an electrode spaced therefrom and including means to provide a relatively rotatable and ionizable gas-filled gap therebetween, means for ionizing said gas to carry said winding current across said gap comprising thermionically emissive material surfaces operatively associated with each of said electrodes, and means for maintaining said ionizable gas in said gap at a pressure between approximately 50 to 75 mm. of mercury absolute.

8. An electro-mechanical machine comprising a rotor, an operating current carrying winding and a connected electrode on said rotor, a stator electrode spaced from said rotor electrode to provide a relatively rotating gap therebetween, means to provide an ionizable gas therein, said winding, electrodes, and gap forming parts of an operating current carrying circuit, means for ionizing the gas in said gap for conduction by electron flow comprising a thermionically emissive surface operatively associated with at least one of said electrodes, and means for only temporarily heating said thermionically emissive surface to initiate the emission of electrons therefrom.

9. An electro-mechanical machine comprising a rotor with an operating current circuit therethrough and including a generally ring-shaped inner electrode connected in said circuit and carried by said rotor, said circuit also including an outer generally ring-shaped stator electrode concentric with and spaced from said rotor electrode to provide a generally uniform and relatively rotating gap therebetween, and gaseous brush means for conducting said operating current across said relatively rotating gap comprising an ionizable gaseous medium in said gap with sealing means to retain it and a thermionically emissive material operatively associated with at least one of said two electrodes of said gap.

10. An electro-mechanical machine comprising a rotor carrying a part of an operating current circuit including a pair of connected and axially spaced electrodes on said rotor, a pair of operatively co-operating electrodes spaced respectively from each of the rotor electrodes to provide relatively rotatable and ionizable gas-filled gaps therebetween, only one of said rotor electrodes having a thermionically emissive surface operatively associated therewith and only one of the associated electrodes of the other gap having a thermionically emissive surface operatively associated therewith to thereby provide for flow of said operating current of said circuit across one of said gaps in one direction and across the other of said gaps in the opposite direction.

11. An alternating current, electro-mechanical machine comprising a rotor having a winding and a pair of axially spaced electrodes carried thereby, a pair of stator electrodes spaced from and co-operating respectively with said pair of rotor electrodes to provide a pair of ionizable gas-filled gaps therebetween, only one of said rotor electrodes of one gap and only one of said stator electrodes of the other gap having thermionic surface means operatively associated therewith to thereby provide for the flow of alternating current across one of said gaps in one direction and across the other of said gaps in the opposite direction, said gaps having an electrostatic screen therebetween.

12. A multi-phase, alternating current, electro-mechanical machine comprising a rotor having three axially spaced electrodes rotating therewith, three stator electrodes co-operating respectively with, and spaced from, said rotor electrodes to define three ionizable gas-filled gaps therewith, each of said electrodes of each said gap having a thermionically emissive surface means operatively associated therewith, and means for connecting three phase and machine operating alternating current across said three gaps.

13. An electro-mechanical machine comprising a rotor having four axially spaced electrodes rotating therewith, a stator electrode operatively associated with, and spaced from, each of said rotor electrodes to define four ionizable gas-filled gaps, three of said gaps having thermionically emissive material operatively associated with only one of its electrodes for current flow in only one direction and the other of said gaps having thermionically emissive material operatively associated with the other of its electrodes for operating current flow only in the opposite direction.

14. In an electro-mechanical machine having a rotor including part of an operating current circuit, ionic brush means connected in said circuit and comprising a rotor electrode and a stator electrode defining a relatively rotating and ionizable gas-filled gap therebetween, and grid means in said gap for controlling the space current flowing through said ionized gas in said gap.

15. An electro-mechanical machine comprising a rotor carrying a winding and a connected electrode forming part of an operating current carrying circuit including a stator electrode spaced from said rotor electrode to define a relatively rotatable gap therebetween, means for maintaining an ionizable gaseous medium in said gap, means for ionizing the gaseous medium in said gap comprising a thermionically emissive surface operatively associated with at least one of said electrodes, and means independent of said electrodes for initiating ionization of said gas in said gap.

16. An electro-mechanical machine comprising a rotor carrying a coil and a connected electrode forming part of an operating current carrying circuit including a stator electrode spaced from said rotor electrode to define a relatively rotating gap, means providing an ionizable gaseous medium in said gap, means for ionizing said gaseous medium comprising thermionically emissive material operatively associated with at least one of said electrodes and grid means in said gap for initiating said ionization.

17. In an electro-mechanical machine having a rotor carrying a part of an operating current circuit, frictionless and gaseous brush means comprising first and second annular cylindrical ring electrodes each of electrically conductive materials and mounted in spaced concentric relationship for relative rotation, the outer diameter of one said ring electrode being less than the inner diameter of the other of said ring electrodes to define a gap therebetween, said ring electrodes being shaped and positioned so that said gap has a substantially constant and uniform dimension at all points during said relative rotation, means for retaining an ionizable gas in said gap, and means for ionizing said gas comprising electron emissive thermionic cathode means operatively associated with one of said electrodes.

References Cited in the file of this patent

UNITED STATES PATENTS

| | | |
|---|---|---|
| 1,001,975 | Murgas | Aug. 29, 1911 |
| 2,067,382 | Du Mont | Jan. 12, 1937 |
| 2,315,176 | Zarcharia | Mar. 30, 1943 |
| 2,426,199 | Gould | Aug. 26, 1947 |
| 2,467,243 | Tillman | Apr. 12, 1949 |
| 2,590,168 | Felici | Mar. 25, 1952 |
| 2,696,563 | Coleman | Dec. 7, 1954 |
| 2,793,325 | Wenzel | May 21, 1957 |
| 2,809,306 | Coleman | Oct. 8, 1957 |
| 2,889,531 | Ellerman | June 2, 1959 |